United States Patent [19]

Wedam et al.

[11] Patent Number: 5,097,347

[45] Date of Patent: Mar. 17, 1992

[54] METHOD AND APPARATUS FOR GENERATING A PLAYBACK CLOCK FROM A 2.5 MHZ CHROMA PLL

[75] Inventors: Werner F. Wedam, Lawrenceville; Alvin Balaban, Lebanon, both of N.J.

[73] Assignee: SamSung Electronics Co., Ltd., Suwon, Rep. of Korea

[21] Appl. No.: 607,709

[22] Filed: Nov. 1, 1990

[51] Int. Cl.$^5$ .............................................. H04N 9/79
[52] U.S. Cl. ................................... 358/335; 358/310; 358/330
[58] Field of Search ................... 358/310, 36, 40, 339, 358/340, 330, 320, 328, 25, 335

[56] References Cited

U.S. PATENT DOCUMENTS 4,956,719 9/1990 Yamashita ............................. 358/310
4,969,033 11/1990 Yamada et al. ........................ 358/36

Primary Examiner—Robert L. Richardson
Assistant Examiner—Robert Chevalier
Attorney, Agent, or Firm—Robert E. Bushnell

[57] ABSTRACT

In a video cassette recorder (VCR) including a video signal processing system having a source of a reference signal having a first frequency of 2.517 MHz, a clock signal generating circuit comprises a first frequency multiplier circuit of a balanced modulator type, having an input coupled to the source of a reference signal and having an output for providing a signal including a component having a second frequency of twice the first frequency. A filter arrangement has an input coupled to the output of the first frequency multiplier circuit, has an output, and has a response characteristic peak substantially at the second frequency. A second frequency multiplier circuit of a balanced modulator type, has an input coupled to the output of the bandpass filter arrangement and has an output for providing a signal including a component having a third frequency of twice the second frequency.

18 Claims, 5 Drawing Sheets

METHOD AND APPARATUS FOR GENERATING A PLAYBACK CLOCK FROM A 2.5 MHZ CHROMA PLL

BACKGROUND OF THE INVENTION

The present invention relates generally to video processing systems and, more particularly, to time base correction in video processing systems used in video cassette recorders (VCR's) for the recording and playback of television signals.

Time base correction is generally required in video processing systems. See for example, Television Engineering Handbook, K. Blair Benson, Editor in Chief, McGraw-Hill Book Company, New York; 1986, Section 15.5. In advanced digital VCR systems utilizing advanced processing, a concomitant need also arises for clocks used in a time base corrector for digitizing the video information. Such a clock is required to be line locked and to provide an output signal exhibiting a high signal to noise ratio and moreover, it should be able to track fast time changes in the input synchronizing signal. That is, it must exhibit a fast transient response. Thus, in a system utilizing digital processing, a clock for an A/D converter can typically be derived from the horizontal sync rate frequency, which may exhibit jitter on playback from a VCR, so that the output signal of the A/D converter exhibits similar jitter. This output can then be corrected for jitter in a time-base corrector wherein the write or input clock exhibits similar jitter and the read or output clock is relatively free of jitter so as to result in a substantially jitter-free output signal. It is also desirable that the arrangement used should utilize relatively few parts and be capable of realization in integrated circuit (IC) form.

Methods available for generating such clock signals from a source such as the horizontal sync signal include the use of a single phase locked loop (PLL), a multiple PLL and, it is herein recognized, frequency multiplier arrangements. A VCR typically includes a phase locked loop operating at 2.517 MHz, which corresponds to 160 fm (160 times the horizontal frequency). For example, such a frequency is utilized for generating four phase signals at the 629 kHz color signal frequency in a color-under system in a typical VHS type of VCR. The time base corrector typically requires a frequency of 10.07 MHz (640 fm). Thus, for example, in a VCR bandwidth compression system such as that described in U.S. patent application Ser. No. 07/569,029, filed Aug. 17, 1990 in the names of Strolle et al. entitled AN IMPROVED VIDEO SIGNAL RECORDING SYSTEM, a luminance spectrum is "folded" about a folding frequency of about 5 MHz. The Nyquist frequency for sampling this signal is at twice this value. In order to obtain a signal at 10.07 MHz, a phase locked oscillator can be synchronized to the 2.517 MHz signal of the above-mentioned PLL. However, this approach requires considerably more parts which would also add to the cost of VCR's that do not require advanced signal processing. Furthermore, the jitter characteristics of the signal would be affected by the characteristics of the PLL, and more particularly, the loop transient response.

SUMMARY OF THE INVENTION

In accordance with a first aspect of the invention, in a video recorder including a video signal processing system having a source of a reference signal with a first frequency, a clock signal generating circuit includes a first frequency multiplier circuit having an input coupled to the source of a reference signal and having an output for providing a signal of a second frequency, the second frequency being a multiple of the first frequency. A filter arrangement has an input coupled to the output of the first frequency multiplier circuit, an output, and a response characteristic favoring transmission of a signal having the second frequency. A second frequency multiplier circuit has an input coupled to the output of the filter arrangement and has an output.

In accordance with another aspect of the invention, the second frequency multiplier circuit generates a signal at the output thereof having a third frequency, the third frequency being a multiple of the second frequency.

In accordance with yet another aspect of the invention, the first and second frequency multiplier circuits comprise respective balanced modulators.

In accordance with still another aspect of the invention, the filter arrangement comprises a bandpass filter.

In accordance with still yet another aspect of the invention, the first and second frequencies are in the ratio of 1 to 2.

In accordance with a further aspect of the invention, the second and third frequencies are in the ratio of 1 to 2.

In accordance with still a further aspect of the invention, a clock signal generating circuit in a video tape recording system including a video signal processing system having a source of a reference signal having a frequency of approximately 2.517 MHz and exhibiting a first time jitter, comprises a first frequency multiplier circuit having an input coupled to the source of a reference signal and having an output for providing a first output signal of a second frequency, the second frequency being twice the first frequency and exhibiting a second time jitter related to the first time jitter; a filter arrangement having an input coupled to the output of the first frequency multiplier circuit, having an output, and having a response characteristic favoring transmission of a signal having the second frequency; a second frequency multiplier circuit having an input coupled to the output of the filter means and having an output for providing a second output signal of a twice the second frequency and exhibiting a third time jitter related to the first time jitter; and an analog to digital converter, the second output signal being applied to the analog to digital converter as a clock signal therefor.

In accordance with still yet a further aspect of the invention, the clock signal generating circuit in a video tape recording system includes a time base correction device wherein an output of the analog to digital converter is applied to an input of the time base correction device.

DESCRIPTION OF THE PREFERRED EMBODIMENTS

Figure 1:
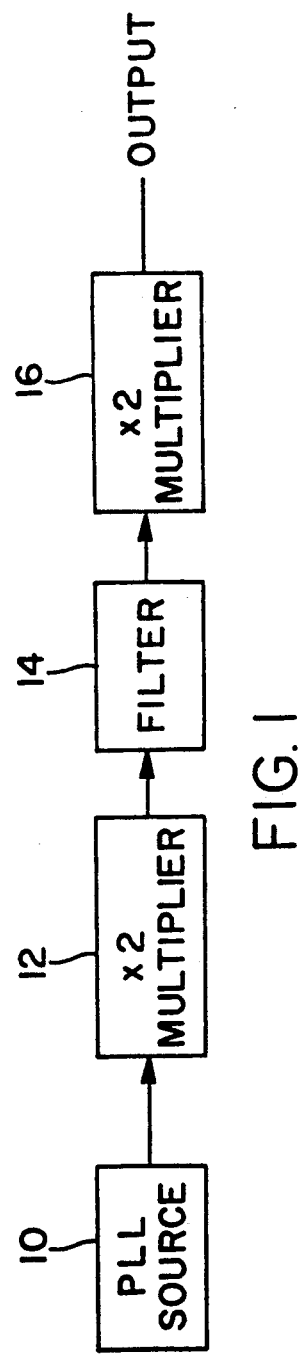
FIG. 1 shows an embodiment in block diagram form in accordance with the invention.

FIG. 1 shows an embodiment in accordance with the invention for generating a clock signal. A signal of 2.517

MHz, which corresponds to 160 fm, is generated by a phase locked loop 10 in a VCR. This signal is applied to a ×2 multiplier 12 by the output of phase locked loop 10 being coupled to the input of multiplier 12. Preferably, multiplier 12 is of the balanced modulator type wherein the input signals are balanced out and only the modulation products appear in the output. For example, a four quadrant multiplier of the Gilbert cell type meets these requirements. In the ×2 multiplier, both inputs represent the fundamental signal frequency to be multiplied and the output will contain a double frequency component. The output of multiplier 12 is coupled to the input of a bandpass filter 14 for selecting and passing the double frequency component. Since multiplier 12 is preferably of the balanced type, the requirements placed on filter 14 are reduced by there not being any stringent need to suppress a fundamental frequency component already substantially balanced out by multiplier 12.

The output of filter 14 is coupled to the input of a second ×2 multiplier 16. Essentially, multiplier 16 can be of the same type as multiplier 12. Accordingly, the output of multiplier 16 will be a signal having a frequency of four times the input frequency to multiplier 12, that is, 10.07 MHz.

It will be understood by one skilled in the art that bandpass filter 14 can be replaced by a lowpass filter with substantially similar performance being thereby attained.

Figure 2:
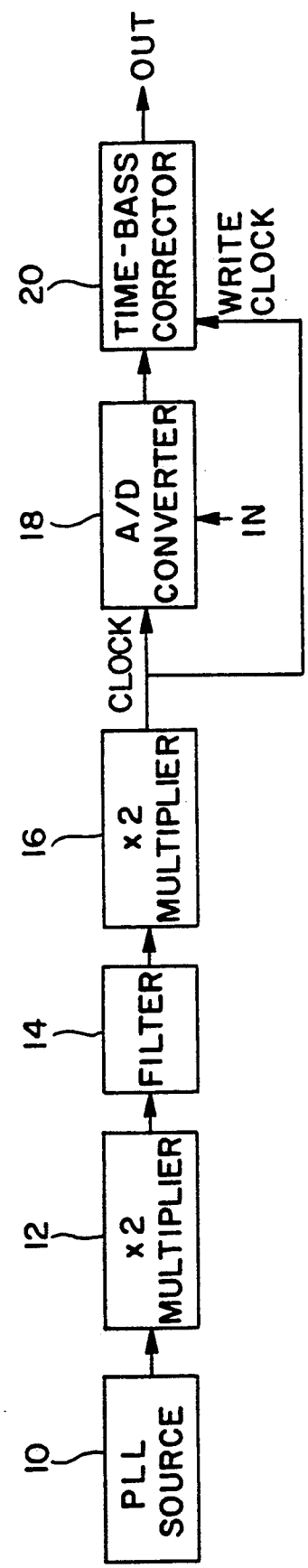
FIG. 2 shows an embodiment in block diagram form in accordance with the invention.

FIG. 2 shows an embodiment wherein the output of mutiplier 16 is applied as the clock input of an A/D converter 18. The output of A/D converter 18 is applied as the input to a time-base corrector 20. The output of multiplier 16 is also applied to the write clock input of time-base corrector 20. Any filtering of the output of multiplier 16 and other processing of the output of A/D converter 18 which may be required in certain cases is not shown.

Figure 3:
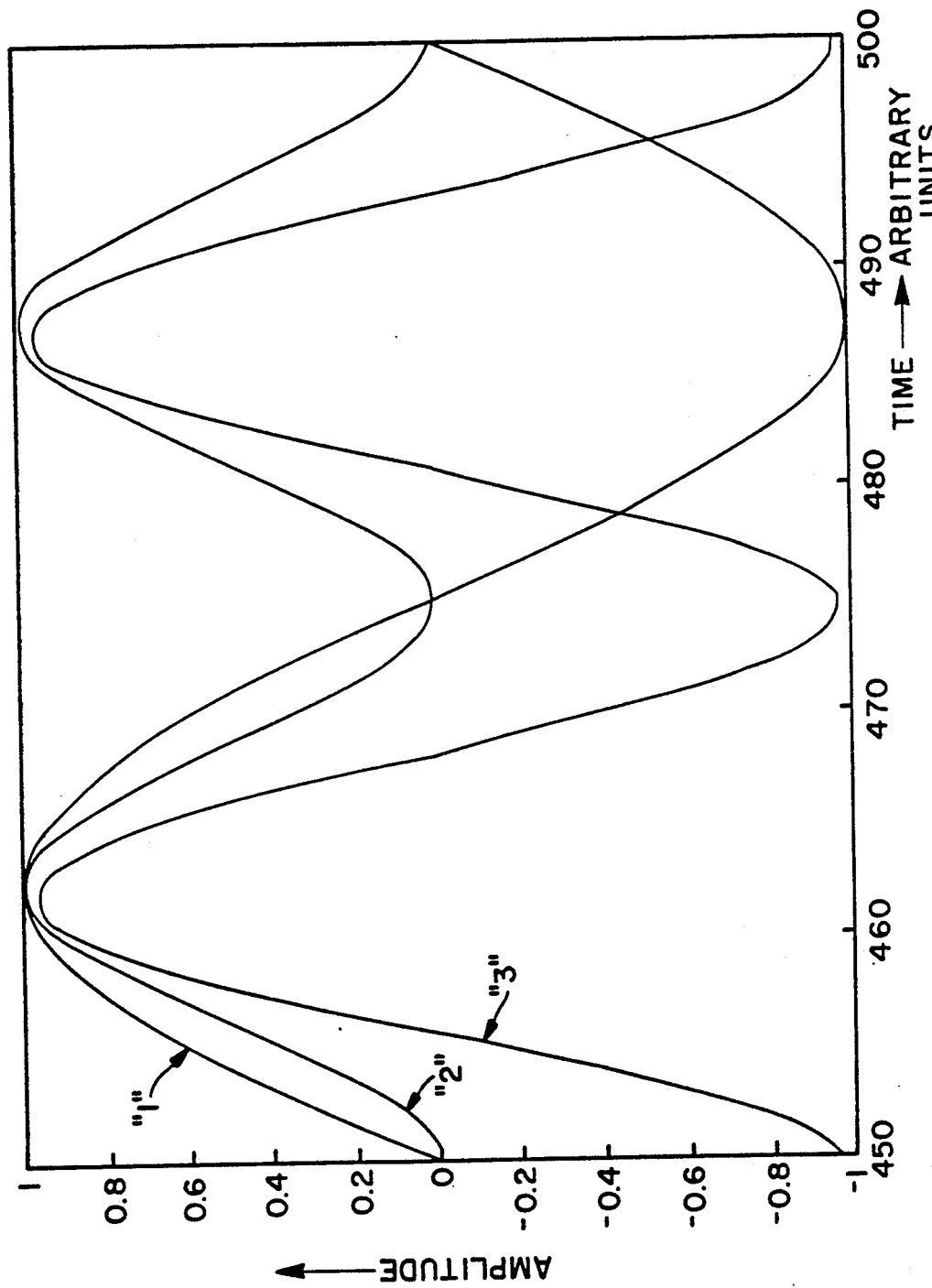
FIGS. 3 through 5(B) show graphs helpful to gaining an understanding of the invention.

FIG. 3 shows calculated characteristics obtained by mathematical simulation. One cycle of the fundamental frequency signal is shown by the graph line marked 1; the output of multiplier 12 is shown by the graph line marked 2; and the output of bandpass filter 14 is shown by the graph line marked 3.

Figure 4:
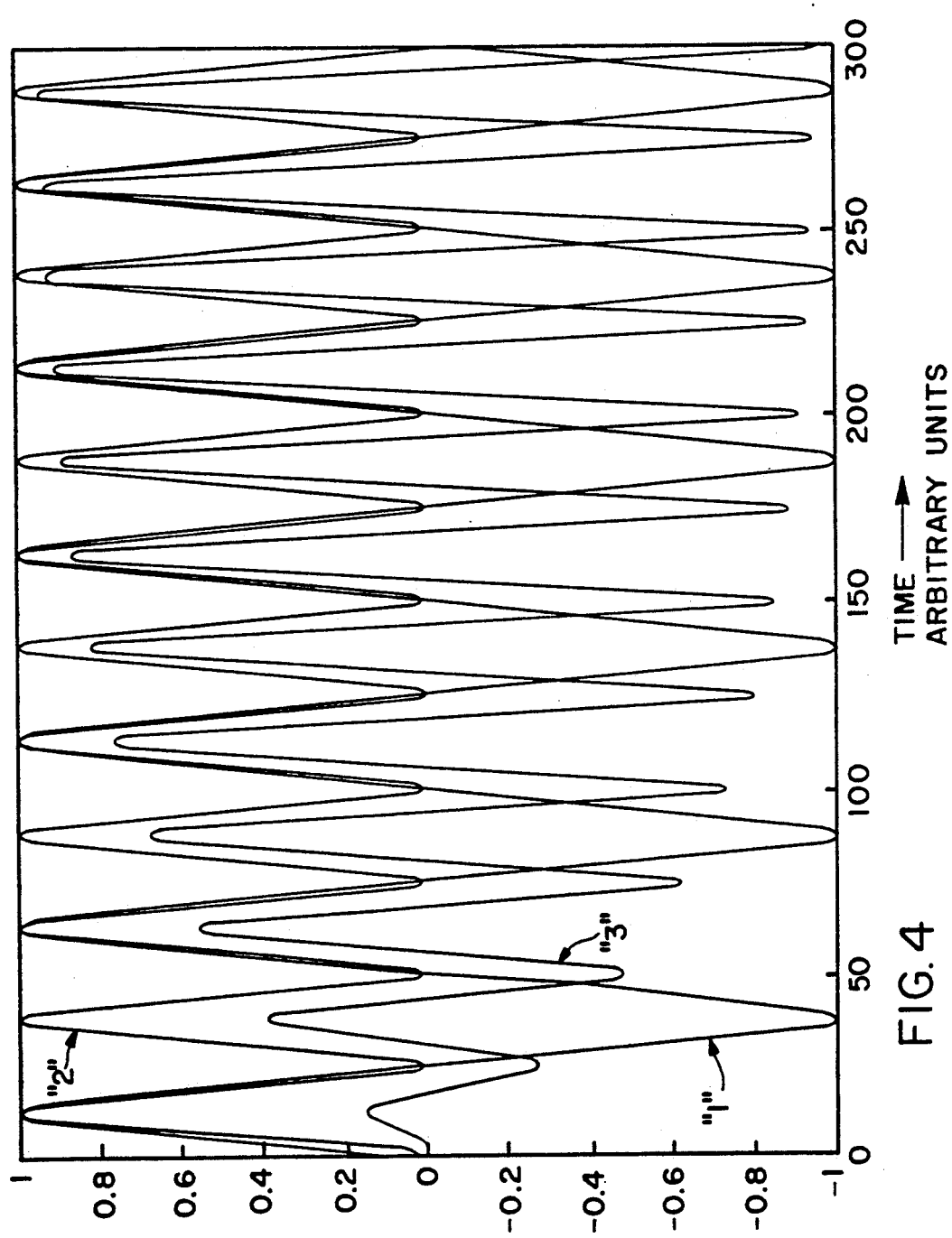

FIG. 4 shows the transient response to a signal applied at the origin of the graph. Here also, the fundamental frequency input signal is shown by the graph line marked 1; the output of multiplier 12 is shown by the graph line marked 2; and the output of bandpass filter 14 is shown by the graph line marked 3.

Figure 5A:
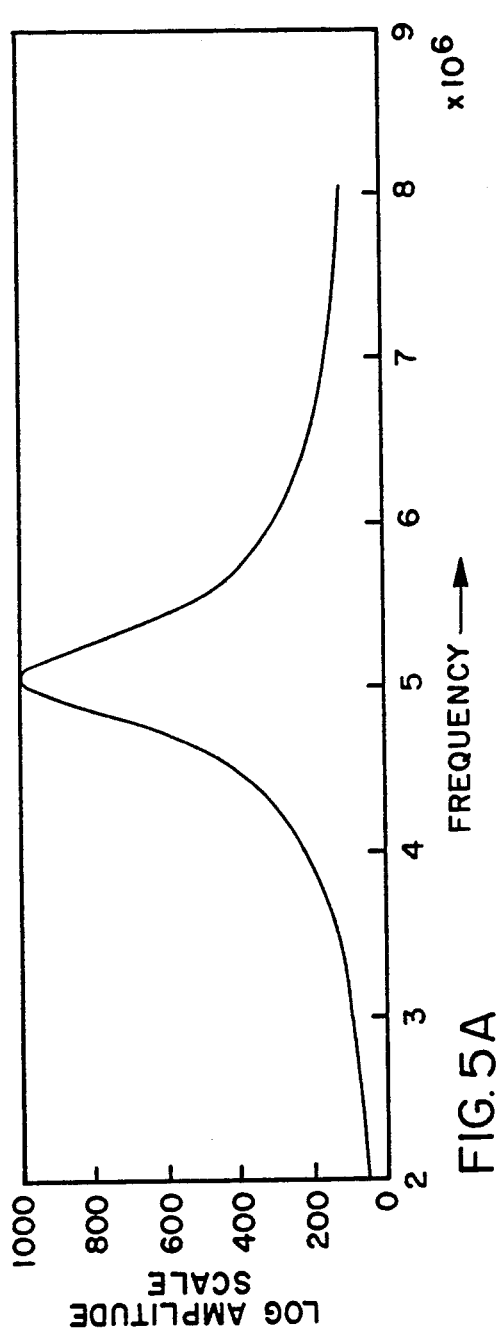
Figure 5B:
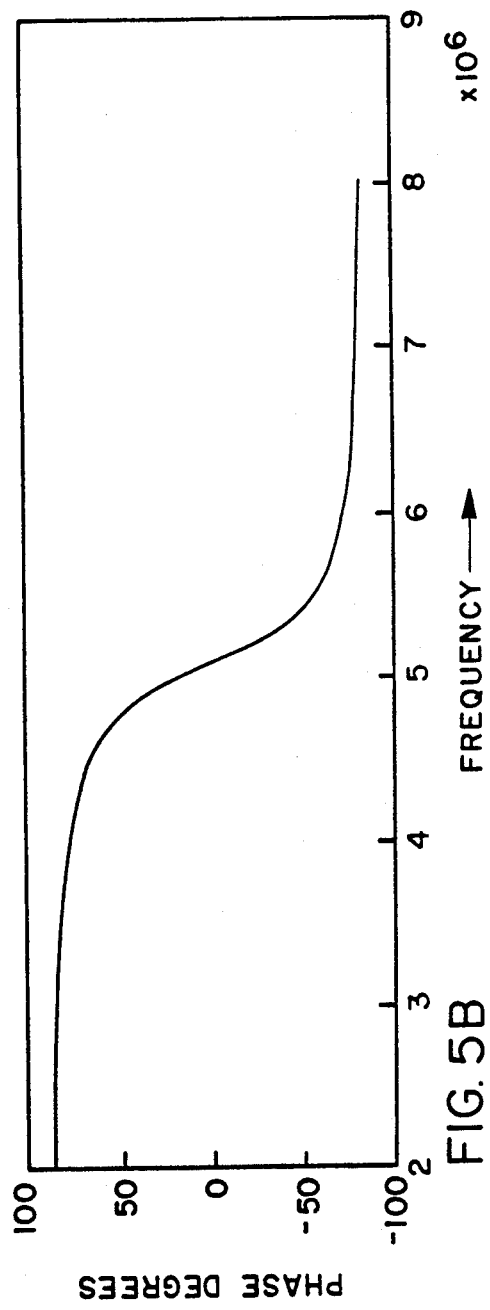

FIGS. 5(A) and 5(B) respectively shows the amplitude and phase response of bandpass filter 14.

While the invention has been described by way of an exemplary embodiment, various changes and modifications will be apparent to those skilled in the art to which it pertains. Thus, various types of modulators can be used for the multipliers. For example, balanced diode modulators such as bridge or Cowan modulators can be used. However, it is not essential that the multipliers be balanced, though this is preferable. It is also not essential that the filters be bandpass filters. It will also be apparent to those skilled in the art that, while the exemplary embodiment has been described in terms of frequencies and attributes relating mostly to the VHS tape recording system, the invention is applicable to other systems wherein similar requirements arise. Changes and modifications to that end will be apparent to one of skill in the art to which it pertains. These and like changes are intended to be within the spirit and scope of the invention, which is limited only by the claims following.

What is claimed is:

1. In a video recorder including video signal processing system having a phase locked loop source of a reference signal having a first frequency, a clock signal generating circuit comprising:

a first frequency multiplier circuit having an input coupled to said phase locked loop source of said reference signal and having an output for providing a signal of a second frequency, said second frequency being a multiple of twice said first frequency;

filter means having an input coupled to said output of said first frequency multiplier circuit, having an output, and having a response characteristic for transmission of a signal having said second frequency; and a second frequency multiplier circuit having an input coupled to said output of said filter means and having an output for providing a signal of a third frequency, said third frequency being a multiple of twice said second frequency.

2. A clock signal generating circuit in accordance with claim 1, wherein said first and second frequency multiplier circuits comprise respective balanced modulators.

3. A clock signal generating circuit in accordance with claim 1, wherein said filter means comprises a bandpass filter.

4. A clock signal generating circuit in accordance with claim 1, wherein said filter means comprises a lowpass filter.

5. A clock signal generating circuit in accordance with claim 1, wherein said first and second frequencies are in the ratio of 1 to 2.

6. A clock signal generating circuit in accordance with claim 5, wherein said second and third frequencies are in the ratio of 1 to 2.

7. In a video cassette recorder (VCR) including a video signal processing system having a source of a reference signal having a first frequency of 2.517 MHz, a clock signal generating circuit comprising:

a first frequency multiplier circuit of a balanced modulator type, having an input coupled to said source of a reference signal and having an output for providing a signal including a component having a second frequency of twice said first frequency;

bandpass filter means having an input coupled to said output of said first frequency multiplier circuit, having an output, and having a response characteristic peak substantially at said second frequency; and a second frequency multiplier circuit of a balanced modulator type, having an input coupled to said output of said bandpass filter means and having an output for providing a signal including a component having a third frequency of twice said second frequency.

8. A clock signal generating system in accordance with claim 7, wherein said component of said third frequency is a playback clock signal in said VCR.

9. In a video tape recording system including a video signal processing system having a source of a reference signal having a first frequency tending to exhibit a first time jitter, a clock signal generating circuit comprising:

a first frequency multiplier circuit having an input coupled to said source of said reference signal and having an output for providing a signal of a second frequency, said second frequency being a multiple of twice said first frequency and exhibiting a second time jitter related to said first time jitter;

filter means having an input coupled to said output of said first frequency multiplier circuit, having an output, and having a response characteristic for transmission of a signal having said second frequency; and a second frequency multiplier circuit having an input coupled to said output of said filter means and having an output for providing an output signal of a third frequency exhibiting a third time jitter related to said first time jitter.

10. A clock signal generating circuit in accordance with claim 9, wherein said third frequency is twice said second frequency.

11. A clock signal generating circuit in accordance with claim 10, wherein said first frequency is a multiple of a horizontal sync frequency.

12. A clock signal generating circuit in accordance with claim 11, wherein said first frequency is 160 times the horizontal sync frequency and said third frequency is 640 times the horizontal sync frequency.

13. A clock signal generating circuit in accordance with claim 12, wherein said first frequency is approximately 2.517 MHz and said third frequency is approximately 10.07 MHz.

14. In a video tape recording system including a video signal processing system having a source of a reference signal having a frequency of approximately 2.517 MHz and exhibiting a first time jitter, a clock signal generating circuit comprising:

a first frequency multiplier circuit having an input coupled to said source of a reference signal and having an output for providing a first output signal of a second frequency, said second frequency being twice said first frequency and exhibiting a second time jitter related to said first time jitter;

filter means having an input coupled to said output of said first frequency multiplier circuit, having an output, and having a response characteristic favoring transmission of a signal having said second frequency;

a second frequency multiplier circuit having an input coupled to said output of said filter means and having an output for providing a second output signal of twice said second frequency and exhibiting a third time jitter related to said first time jitter; and an analog to digital converter, said second output signal being applied to said an analog to digital converter as a clock signal therefor.

15. A clock signal generating circuit in accordance with claim 14, wherein an output of said analog to digital converter is provided for application to an input of time base correction means.

16. A clock signal generating circuit in accordance with claim 14, including time base correcting means, wherein an output of said analog to digital converter is provided for application to an input of said time base correction means and a write clock of said time base correction means is said second output signal.

17. In a video recorder including a video signal processing system having a source of a reference signal having a first frequency, a method of generating a clock signal comprising the steps of:

applying said reference signal to a first frequency multiplier circuit for providing a signal of a second frequency, said second frequency being a multiple of twice said first frequency;

applying said signal of said second frequency to filter means having a response characteristic for transmission of a signal having said second frequency; and applying the output of said filter means to a second frequency multiplier circuit.

18. A clock signal generating circuit in accordance with claim 1, wherein said first and third frequencies have a ratio of 1 to 4.

* * * * *

UNITED STATES PATENT AND TRADEMARK OFFICE
CERTIFICATE OF CORRECTION

PATENT NO. : 5,097,347
DATED : Mar. 17, 1992
INVENTOR(S) : Werner F. Wedam, et al It is certified that error appears in the above-indentified patent and that said Letters Patent is hereby corrected as shown below:

Column 1   Line 41-42,   change "160 fm" to --160 $f_h$ --;

Line 47,      change "640 fm" to --640 $f_h$--;

Column 3

Line 1,       change "160 fm" to --160 $f_h$--;

Line 51       change "shows" to --show--:

Signed and Sealed this

Twenty-ninth Day of August, 1995

*Attest:*

BRUCE LEHMAN

*Attesting Officer*     *Commissioner of Patents and Trademarks*